US008120497B2

(12) United States Patent
Binmore

(10) Patent No.: US 8,120,497 B2
(45) Date of Patent: Feb. 21, 2012

(54) RFID TRANSPONDER ENCLOSURE FOR HARSH ENVIRONMENTS

(75) Inventor: Ian Rex Binmore, Houston, TX (US)

(73) Assignee: Merrick Systems, Inc., Houston, TX (US)

( * ) Notice: Subject to any disclaimer, the term of this patent is extended or adjusted under 35 U.S.C. 154(b) by 414 days.

(21) Appl. No.: 12/266,523

(22) Filed: Nov. 6, 2008

(65) Prior Publication Data

US 2009/0115616 A1 May 7, 2009

Related U.S. Application Data

(60) Provisional application No. 60/985,916, filed on Nov. 6, 2007.

(51) Int. Cl.
*G08B 13/14* (2006.01)

(52) U.S. Cl. ................ 340/572.8; 340/572.1; 340/572.7

(58) Field of Classification Search ............... 340/572.1, 340/572.4, 572.7, 572.8, 572.9, 568.1, 568.6, 340/568.7; 438/30, 99; 174/112; 235/492, 235/112, 375, 449, 488; 384/448
See application file for complete search history.

(56) References Cited

U.S. PATENT DOCUMENTS 5,142,128 A 8/1992 Perkin et al.
5,360,967 A 11/1994 Perkin et al.
5,641,446 A * 6/1997 Kato ........................ 264/328.12
6,255,949 B1 7/2001 Nicholson et al.
6,347,292 B1 2/2002 Denny et al.
6,480,811 B2 11/2002 Denny et al.
6,604,063 B2 8/2003 Denny et al.
6,973,416 B2 12/2005 Denny et al.
7,062,413 B2 6/2006 Denny et al.
7,091,421 B2 * 8/2006 Kukita et al. ................ 174/112
7,199,719 B2 4/2007 Steinberg
7,233,498 B2 * 6/2007 Kerr et al. ..................... 361/737
7,253,736 B2 * 8/2007 Tethrake et al. ........... 340/572.7
7,282,380 B2 * 10/2007 Maruyama et al. ............. 438/30
7,389,205 B2 6/2008 Denny et al.
7,534,045 B2 * 5/2009 Nakajima et al. ............. 384/448
7,606,682 B2 10/2009 Denny et al.
7,912,678 B2 3/2011 Denny et al.
2004/0061994 A1 * 4/2004 Kerr et al. ..................... 361/679
2007/0159337 A1 7/2007 Tethrake et al.
2009/0004772 A1 * 1/2009 Jinbo et al. ...................... 438/99
2009/0115615 A1 * 5/2009 Bleckmann et al. ....... 340/572.8
2010/0115785 A1 * 5/2010 Ben-Shmuel et al. .......... 34/260
2011/0148603 A1 6/2011 Denny et al.

* cited by examiner

*Primary Examiner* — Van T. Trieu
(74) *Attorney, Agent, or Firm* — Fletcher Yoder

(57) ABSTRACT

A radio frequency identification device is enclosed in an enclosure suitable for harsh environments, and is resistant to physical, chemical, temperature, and electro-magnetic abuse. The enclosure includes a shell member configured to deflect direct blows to the transponder and can be shaped to fit various types of surfaces to which it can be affixed.

22 Claims, 9 Drawing Sheets

110 530 210 500 520 100 220 220 600

100
110

RFID TRANSPONDER ENCLOSURE FOR HARSH ENVIRONMENTS

CROSS-REFERENCE TO RELATED APPLICATIONS

This application claims the benefit of U.S. Provisional Patent Application No. 60/985,916, entitled "RFID Transponder Enclosure for Harsh Environments," and filed Nov. 6, 2007.

TECHNICAL FIELD

The present invention relates to the field of radio frequency identification (RFID), and in particular to RFID devices for harsh environments.

BACKGROUND ART

Industrial equipment, such as that used in the oil industry to transfer fluids and gases, has rigorous materials, inspection and use requirements where the accurate and rapid identification of the equipment is necessary. The equipment referenced is typically subjected to extremely harsh and abusive use. Industry attempts to affix devices containing RFID transponders, generally referred to RFID tags, to equipment such as this has typically met with failure due to the tag being damaged, lost or destroyed.

SUMMARY OF INVENTION

In one embodiment, an RFID tag comprises a mounting member, comprising a shell member, an extension positioned with the shell member and configured for attachment to a correspondingly configured surface, a elastomeric member, positioned in the shell member, and an RFID electronics assembly, positioned interior to the elastomeric member.

In another embodiment, a method of enclosing an RFID electronics assembly in an RFID tag comprises embedding the RFID electronics assembly in an elastomeric member, forming an impact-resistant shell in the RFID tag, and bonding the elastomeric member to the shell.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Various embodiments of an RFID tag are packaged in such a manner suitable for harsh environments. The embodiments are extremely durable and resistant to physical, chemical, temperature and electro-magnetic abuse. In addition, the various embodiments can be produced economically and can be used for a wide range of harsh RFID placement environments.

In one embodiment, an RFID electronics assembly with a dipole winding is placed inside an impermeable housing within a protective and chemically resistant packaging which in turn is placed under a protective hard outer shell. The outer shell is shaped to deflect direct blows and may have extensions to it which may be shaped to fit various surfaces, be they flat, curved or contoured. The extensions also enable the item to be welded, bolted, glued or otherwise affixed to a parent component or to a part which in turn may be affixed to a parent component.

Figure 1:
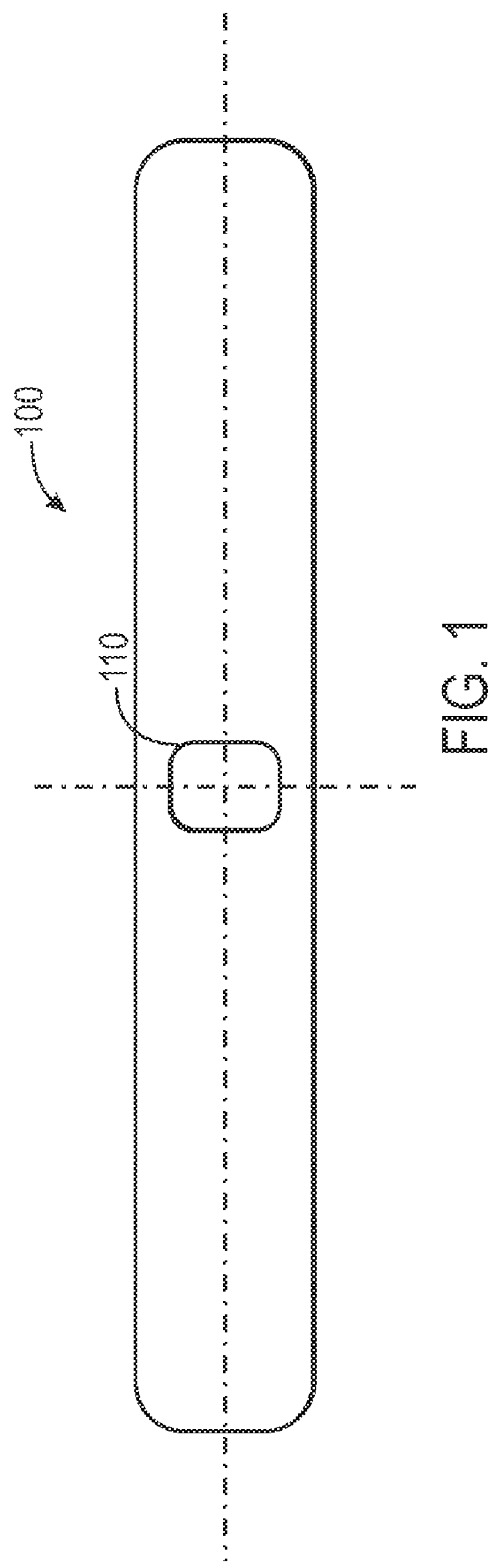
FIG. 1 is a top view illustrating a mounting member of an RFID tag according to one embodiment.

Turning to FIG. 1, a mounting member 100 of one embodiment is illustrated in top view. The mounting member 100 is shown prior to formation of a shell for holding the RFID electronics assembly, and can be manufactured as a straight flat band, then shaped to fit the desired configuration for mounting. An opening 110 is formed in the mounting member 100.

Figure 2:
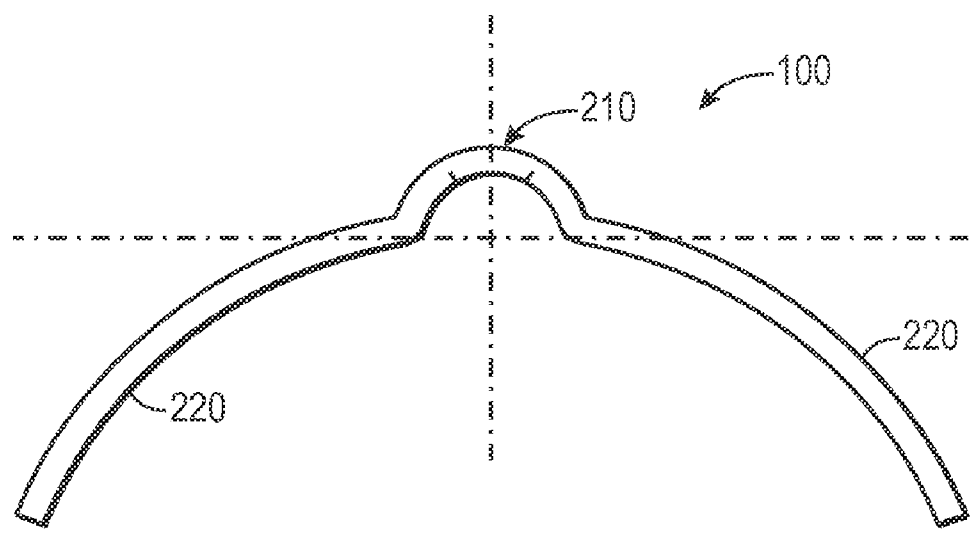
FIG. 2 is a side view illustrating the mounting member of the RFID tag of FIG. 1, after formation of a shell member in the mounting member.

Then in FIG. 2, the mounting member 100 is illustrated in side view, after formation of the shell member 210 and curving the mounting member 100 to match the curvature of an object to which the mounting member 100 is to be attached (not shown in FIG. 2), typically referred to as a parent component. Extension arms 220 provide for attachment of the mounting member to the parent component.

In one embodiment, the mounting member 100 is a steel band, but the mounting member 100 can be any type of material appropriate for the mounting to the parent component. In most oilfield equipment, for example, this will be a type of stainless steel, however it may be MONEL® metal, aluminum, titanium, polyetheretherketone (PEEK) plastic, or any other material appropriate for the intended application.

The mounting member 100 can be welded, glued, bolted or otherwise affixed to the parent component. In some embodiments, an attachment portion, such as a slot, hole, or tab, can be formed in the ends of the extension arms 220, allowing for attachment of a band or other attachment member to the mounting member to surround the parent component, holding the mounting member in place.

Figure 3:
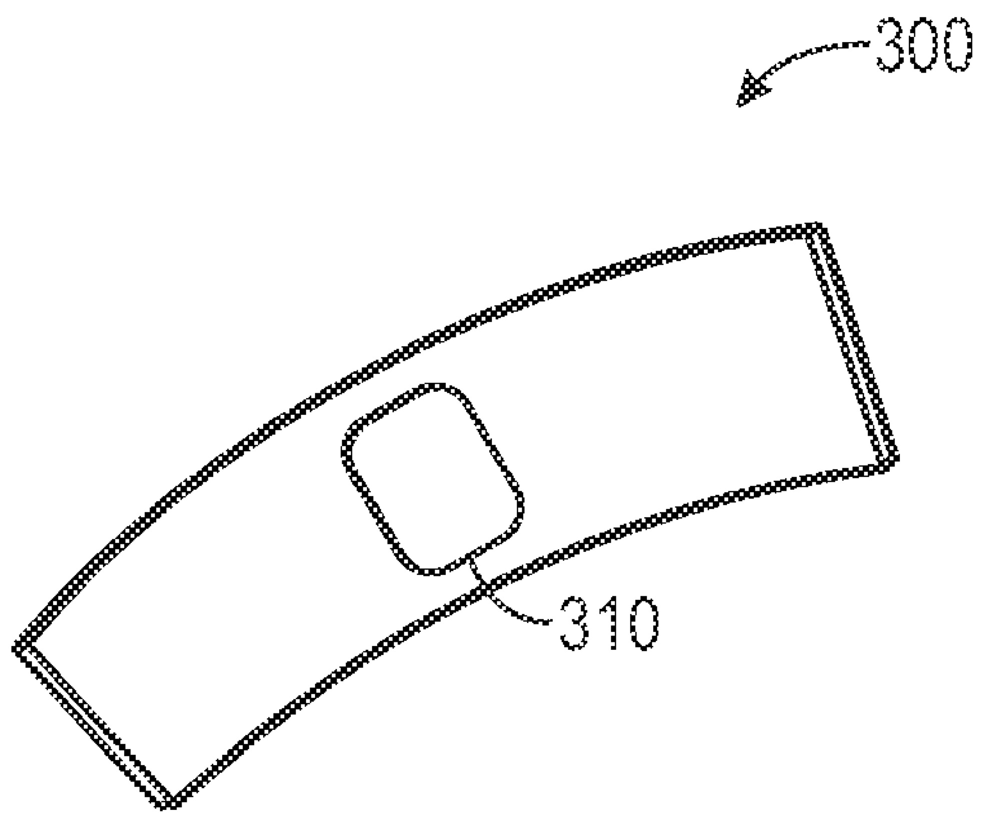
FIG. 3 is a perspective view illustrating a separately formed shell member according to another embodiment.

Although the shell member 210 is illustrated and described above as integral with the remainder of the mounting member 100, the shell member 210 can be manufactured as a separate piece and attached to the mounting member 100 as desired. FIG. 3 is a perspective view of a separate shell member 300 that is designed to be inserted through the opening 110 of the mounting member 100, instead of being integral with it. The shell member 300 typically has an opening 310, which functions as the opening 110 does in the integrally formed shell member 210.

Figure 4:
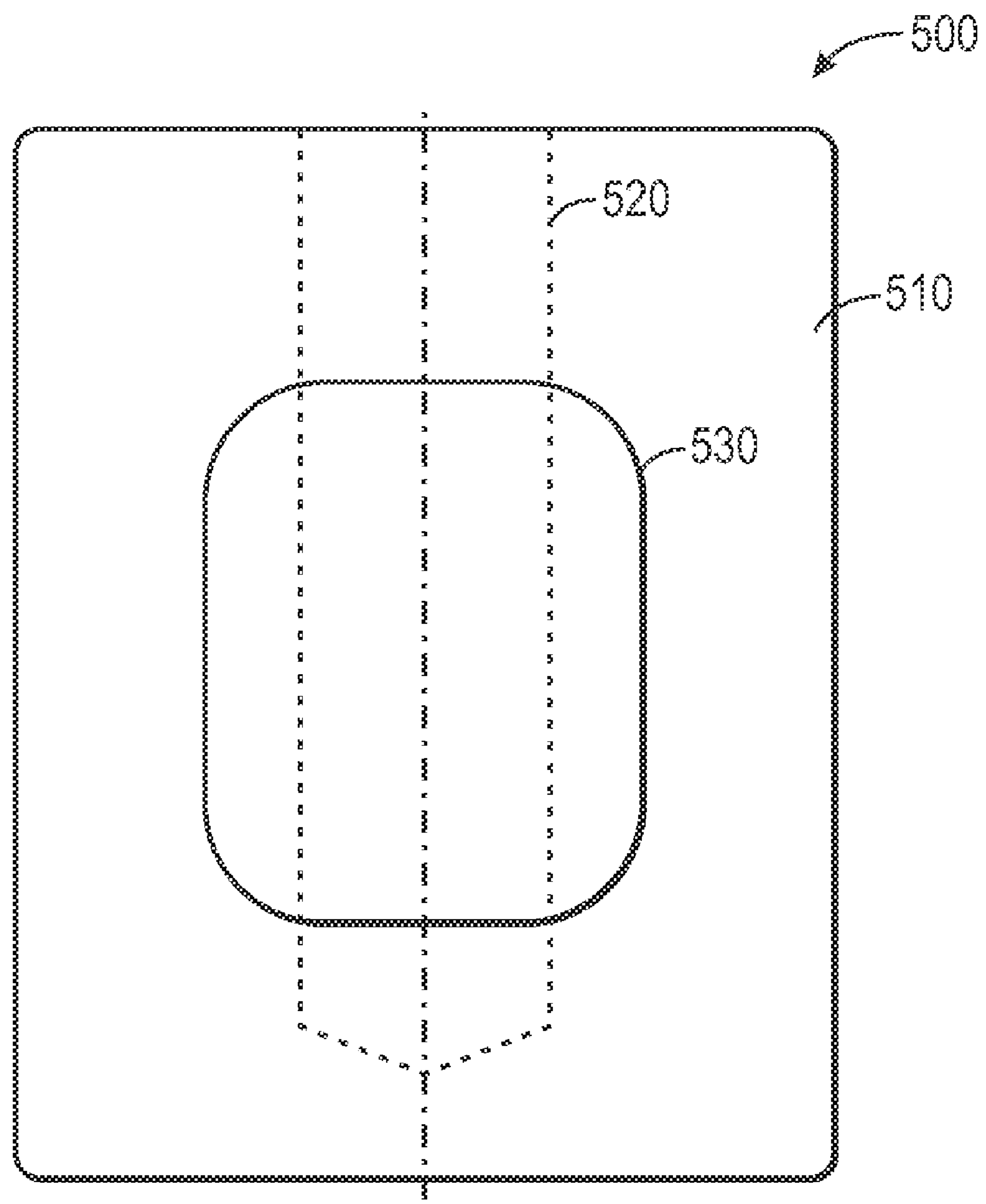
FIG. 4 is a top view illustrating an elastomeric member according to one embodiment.
Figure 5:
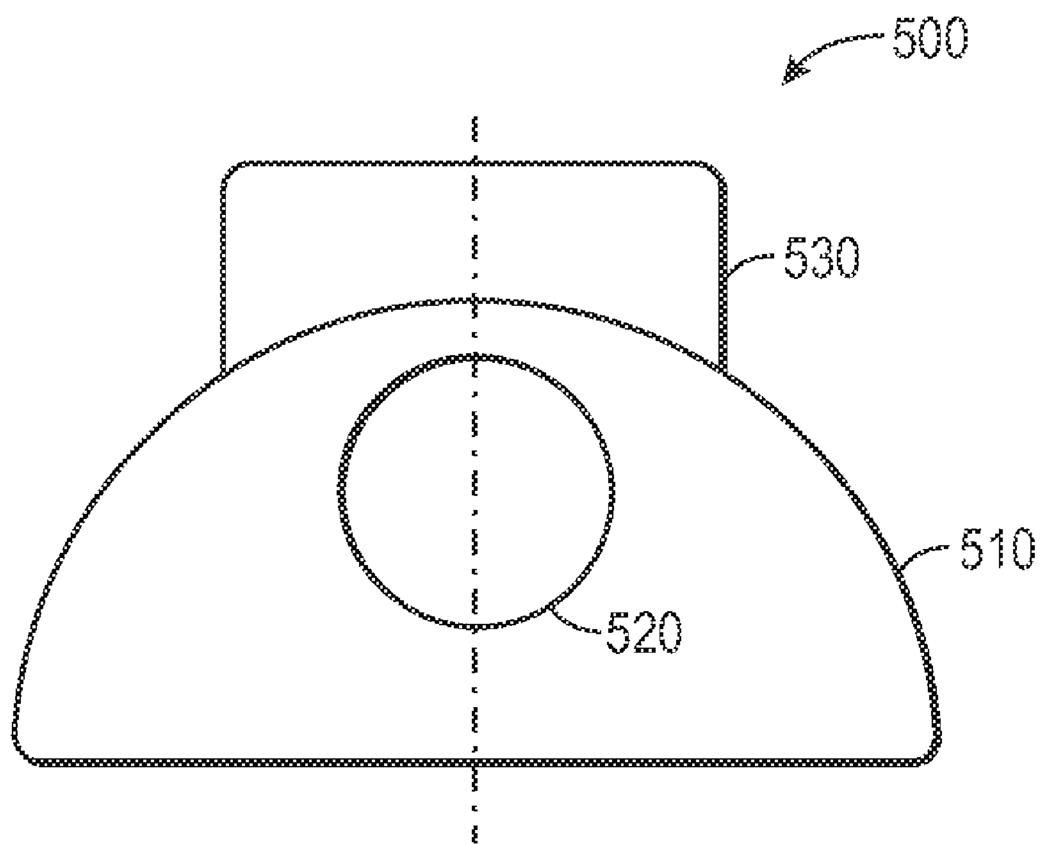
FIG. 5 is a side view illustrating the elastomeric member of FIG. 4.

Turning now to FIG. 4, an elastomeric member 500 according to one embodiment is illustrated in top view. A raised portion 530 protrudes from the upper surface 510 of the elastomeric member 500, to engage with the opening 110 in the shell member 210 of the mounting member 100, as described below. The raised portion 530 can be formed in the upper surface 510 directly, or by pressure when the elastomeric member 500 is positioned in the shell member 210. In FIG. 5, the elastomeric member 500 is illustrated in end view, allowing the cavity 520 that is shown in phantom in FIG. 4 to be seen. The cavity 520 can be formed by molding, grinding, drilling, or any other desired technique for forming a cavity in the elastomeric member 500. The cavity 520 is sized to allow the insertion of the RFID electronics assembly.

In one embodiment, the elastomeric member 500 is made out of PEEK thermoplastic. PEEK is used because it is highly resistant to chemicals, has high strength, absorbs impacts well, has a high melting point and maintains a low brittleness at temperatures below that of liquid nitrogen. Pigment can be added to the elastomeric material for UV resistance if desired. Other materials can be used instead of PEEK thermoplastic, depending on the environmental and operational characteristics of the application. For example, acrylonitrile butadiene styrene (ABS) or other molded plastic could be used under some environmental and operational conditions.

Figure 6:
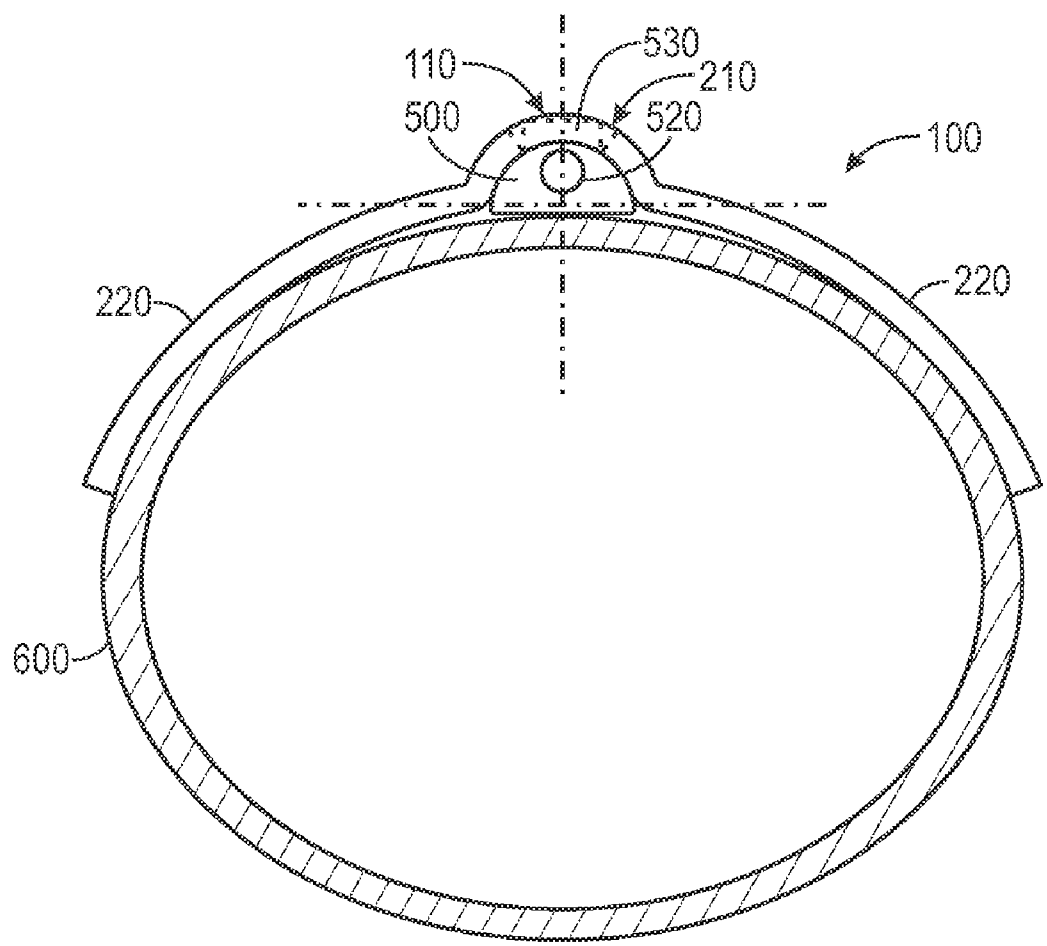
FIG. 6 is an axial view illustrating an object with the RFID tag of FIG. 2 attached to the object.

FIG. 6 is an axial view illustrating a mounting member 100 together with an elastomeric member 500 as in FIGS. 4 and 5, forming an RFID tag that is attached to a parent component 600. One skilled in the art will recognize that the shapes of the mounting member 100 and elastomeric member 500 are by way of example and illustrative only, and any desired shape can be used to match the shape of the parent object 600.

Figure 7:
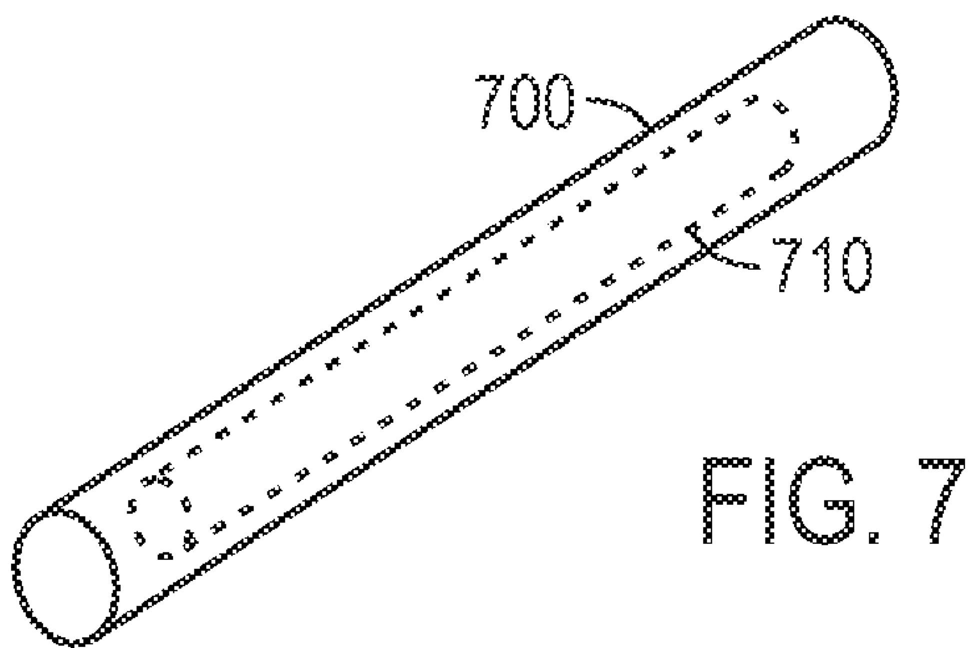
FIG. 7 is a perspective view illustrating an RFID electronics assembly and packing member according to one embodiment.

The elastomeric member 500 holds an RFID electronics assembly 710 within a packing member forming an impermeable, typically spherically ended, cylinder made of high purity industrial grade glass 700, as shown in FIG. 7. For some applications, an optimal frequency for the RFID electronics assembly 710 is 125 KHz-135 KHz, but in other applications a different frequency range may be optimal. In some applications, a high frequency RFID electronics assembly 710 can be used. The packing member 700 is inserted into the cavity 520 in the elastomeric member 500 to minimize stress on the glass. The cylindrical shape of the packing member of FIG. 7 is illustrative and by way of example only, and other shapes can be used depending on the environmental conditions of the intended use. In some embodiments, the packing member 700 is bonded to the elastomeric member 500 to hold it in place using an epoxy. In such embodiments, the epoxy bonding the packing member 700 to the elastomeric member 500 has properties that are appropriate for the expansion coefficients of the material and the temperatures and chemicals to which the RFID tag may be exposed.

As described above, the lobe 530 of the elastomeric member 500 containing the RFID electronics assembly can be designed to protrude up into the opening 110 of the shell member 210 so that if the elastomeric member 500 debonds from the shell member 510, the elastomeric member 500 will continue to be effectively retained under the shell member 210 by the lobe or raised section 530.

Figure 8:
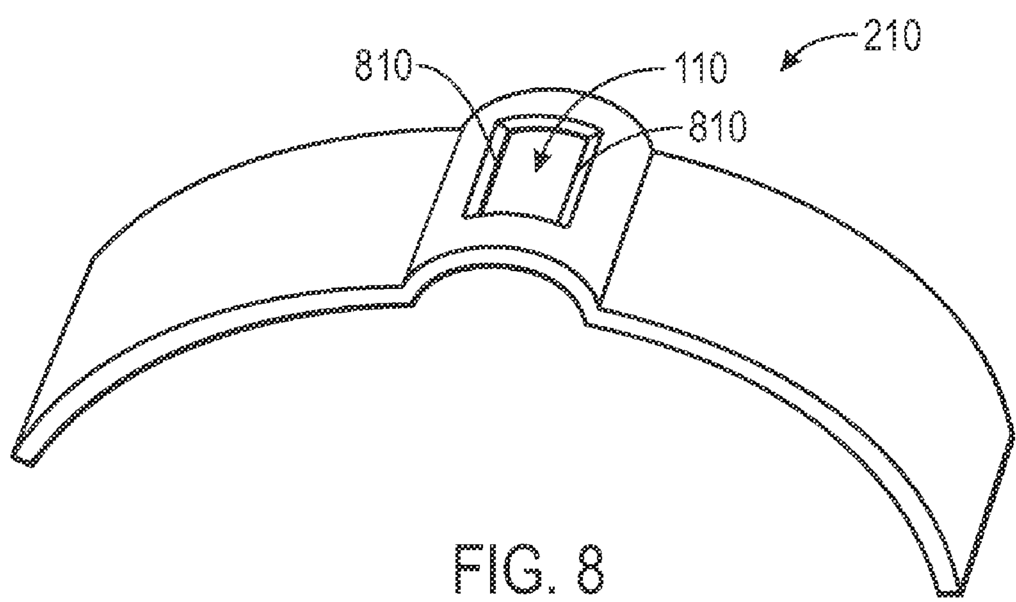
FIG. 8 is a perspective view illustrating the RFID tag mounting member of FIG. 2 and the elastomeric member of FIGS. 4 and 5.

In some embodiments, such as illustrated in FIG. 8, the window or opening 110 of the shell member 210 is designed and manufactured such that the internal edges 810 adjacent the opening 110 of the shell member 210 form an oblique angle relative to the elastomeric member 500, allowing for the bonding material of the elastomeric member 500 to have a stronger bond to the shell member 210. In one embodiment, the bonding material is an epoxy. In another embodiment, the bonding material is the same material as the elastomeric member 500 itself, such as would occur if the elastomeric material is insert molded onto the shell member 210 during manufacture.

In one embodiment, the RFID electronics assembly 710 is packed within the packing member 700 in a silicon or other similar gel material to absorb vibration and avoid crystallization at sustained high temperatures. Other types of materials can be used, so long as they reduce vibration transmission to the RFID electronics assembly or avoid crystallization at sustained high temperatures. One such material is a silica gel that allows operation of the RFID tag at sustained temperatures over 160° C. The specific temperature range is illustrative only, and use of materials that would allow operation of the RFID tags at other sustained temperature ranges is contemplated. The RFID electronics assembly 710 typically has wire bondings that are appropriate for the sustained high and low temperatures that they will encounter in some applications and carries an identifier in such a manner that the identity of the RFID tag will not be lost during sustained high temperature exposure. In some embodiments, the RFID electronics assembly 710 is designed such that it will continue to perform well in high magnetic fields and not be destroyed by rapid and strong magnetic fluctuations nearby. Preferably, the winding of the RFID antennae is placed around a dipole such that the signal will be optimized within the shape of the shell member 210.

The shell member 210 as illustrated in the figures has a convex configuration containing the elastomeric member 500 containing the RFID electronics module. The convex configuration is designed to provide a curved surface that would deflect blows or forces occurring across an axis parallel to the curved surface. The shell member 210 is designed to be strong enough and the angles of the convex curve are configured so as to transfer the energy of most anticipated direct blows through to the parent part 600, rather than allowing significant deformation of the RFID electronics assembly 710, causing failure of the RFID tag.

The curved shell member 210 as illustrated in the figures is open ended and open topped via a small window, the opening 110. The RFID electronics assembly is situated with the shell member in such a position that the RFID dipole antennae is parallel to the axis of the shell member 210, optimizing the electromagnetic field of the assembly and the performance of the antennae. The open ends of the convex curve of the shell member 210 allow the electronic field to complete itself around the dipole curve. These features allow optimum readability of the RFID tag, but are not all necessary for an RFID tag to work. For example, a closed ended curved shell portion could be used to provide impact protection along other axes, such as a hemispherical shell. In such a configuration, additional windows optionally may be formed in the protective shell member 210 for optimal field strength.

In one embodiment, the RFID electronics assembly 710 uses EPROMs to hold the tag identity. In other embodiments, laser etched circuits can be used to configure the tag identity, allowing use of the RFID electronics assembly 710 in environmental conditions where EPROMs are unsatisfactory.

Figure 9A:
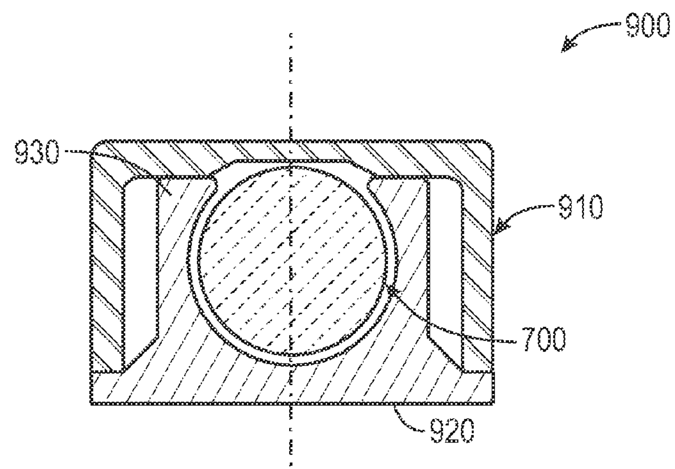
FIG. 9*a* is an end view illustrating an elastomeric member of another embodiment.

FIGS. **9*a*-9*b* illustrate an elastomeric member 900 according to another embodiment. In this embodiment, instead of a monolithic elastomeric member in elastomeric member 500, the elastomeric member is composed of multiple parts that mate with each other to form the elastomeric member 900. As shown in FIG. 9*a*, the elastomeric member 900 has two portions 910 and 920. The relative shapes of the portions 910 and 920 are illustrative and by way of example only and any desired pair of shapes can be used. For example, in one embodiment, portion 910 can be a flat plate and portion 920 can be a covering for the plate 910, forming a cavity between the portions 910 and 920**.

Figure 9B:
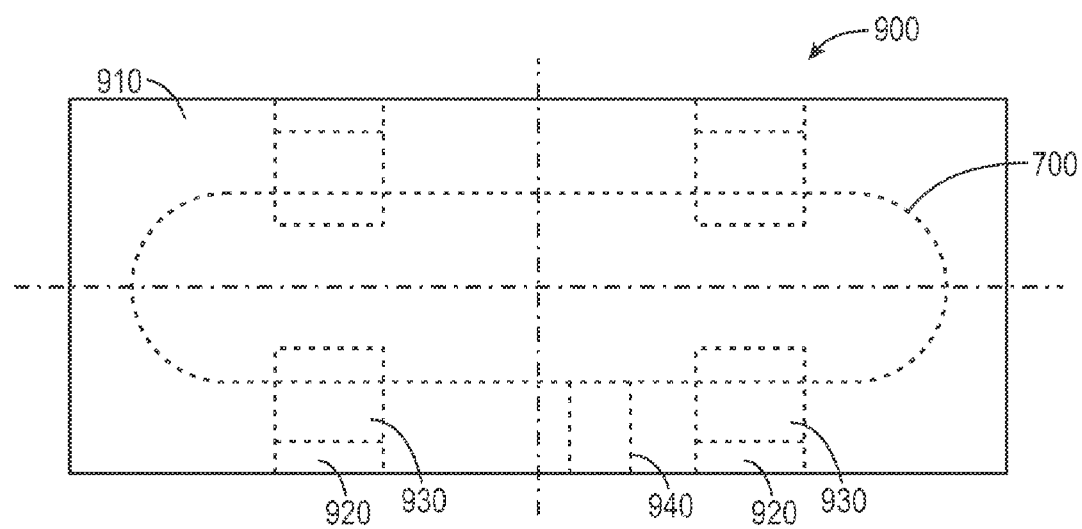
FIG. 9*b* is a top view illustrating the elastomeric member of FIG. 9*a*.

In some embodiments, as illustrated in FIG. **9*a*-9*b*, one or more clips 930 can be used to hold the packing member 700 to one of the portions 910 or 920, holding the packing member 700 in the elastomeric member 900. The shape of the depicted clip is illustrative only and any desired shape of clip can be used. The clip can be formed integrally with one of the portions 910 or 920, as shown in FIGS. 9*a*-9*b* or can be formed separately and attached to one of the portions 910 or 920** before use.

Alternatively, the packing member can be allowed to move in the elastomeric member 500 or 900 by "floating" it in a cushioning gel, protecting the packing member 700 from vibrations and other physical forces with the gel, without rigidly bonding or holding the packing member 700 in place.

In some embodiments, pressure exterior to the elastomeric member 500 or 900 is equalized with pressure in the cavity or space interior to the elastomeric member 500 or 900, to help avoid damage to the packing member 700. This is typically done by forming a passageway from the interior of the elastomeric member 500 or 900 to an exterior surface, such as the passageway 940 of FIG. 9*b*, but any technique for equalizing interior and exterior pressure can be used. The placement, size, and shape of the passageway 940 is by way of example and illustrative only and any convenient passageway configuration and location can be used.

While certain exemplary embodiments have been described in details and shown in the accompanying drawings, it is to be understood that such embodiments are merely illustrative of and not devised without departing from the basic scope thereof, which is determined by the claims that follow.

I claim:

1. An RFID tag comprising:

a mounting member, comprising:

a shell member;

an extension positioned with the shell member and configured for attachment to a correspondingly configured surface;

an elastomeric member, positioned in the shell member; and an RFID electronics assembly, positioned interior to the elastomeric member.

2. The RFID tag of claim 1, the shell member comprising:

an opening formed through a surface of the shell member.

3. The RFID tag of claim 2, wherein the elastomeric member when positioned in the shell member protrudes through the opening.

4. The RFID tag of claim 2, wherein an edge of the shell member adjoining the opening is configured to improve bonding between the shell member and the elastomeric member.

5. The RFID tag of claim 1, wherein the elastomeric member is bonded to the shell member.

6. The RFID tag of claim 1, the elastomeric member comprising:

a substantially cylindrical cavity formed axially within the elastomeric member, wherein the RFID electronics assembly is positioned in the cavity.

7. The RFID tag of claim 1, wherein the RFID electronics assembly is bonded to the elastomeric member.

8. The RFID tag of claim 1, wherein the elastomeric member is composed of an elastomeric material selected to absorb impact, resist chemical degradation, and avoid brittleness at temperatures below that of liquid nitrogen.

9. The RFID tag of claim 1, wherein the elastomeric member is composed of an elastomeric material selected for resistance to ultraviolet radiation.

10. The RFID tag of claim 1, further comprising:

a packing member, the RFID electronics assembly packed within the packing member, wherein the packing member is selected for reduction of vibration transmission between the elastomeric member and the RFID electronics assembly, and for lack of crystallization at sustained high temperatures.

11. The RFID tag of claim 1, the RFID electronics assembly comprising:

an EPROM configured to hold an identity for the RFID tag.

12. The RFID tag of claim 1, the RFID electronics assembly comprising:

a laser etched circuit configured to hold an identity for the RFID tag.

13. A method of enclosing an RFID electronics assembly in an RFID tag, comprising:

embedding the RFID electronics assembly in an elastomeric member;

forming an impact-resistant shell in the RFID tag; and bonding the elastomeric member to the shell.

14. The method of claim 13, wherein the elastomeric member is composed of an elastomeric material selected to absorb impact, resist chemical degradation, and avoid brittleness at temperatures below that of liquid nitrogen.

15. The method of claim 13, forming an impact-resistant shell comprising:

forming an opening in an attachment member; and exerting pressure on the attachment member, thereby forming a protrusion in the attachment member, the protrusion including the opening.

16. The method of claim 13, embedding the RFID electronics assembly in an elastomeric member comprising:

forming a cavity in the elastomeric member parallel to an axis of the elastomeric member;

positioning the RFID electronics assembly in cavity; and bonding the RFID electronics assembly to the elastomeric member.

17. The method of claim 13, further comprising:

forming an opening in the shell; and positioning the elastomeric member in the shell, wherein the elastomeric member protrudes through the opening when positioned in the shell.

18. The method of claim 13, further comprising:

forming an opening in the shell, wherein an edge of the shell adjacent to the opening forms an oblique angle relative to the elastomeric member when the elastomeric member is positioned in the shell.

19. The method of claim 13, embedding the RFID electronics assembly in an elastomeric member comprising:

forming a first portion of the elastomeric member;

forming a second portion of the elastomeric member, configured to mate with the first portion;

positioning the RFID electronics assembly between the first portion and the second portion;

bonding the first portion to the second portion.

20. The method of claim 13, embedding the RFID electronics assembly in an elastomeric member comprising:

holding the RFID electronics assembly in the elastomeric member with a clip.

21. The method of claim 13, embedding the RFID electronics assembly in an elastomeric member comprising:

cushioning the RFID electronics assembly in the elastomeric member with a gel.

22. The method of claim 13, embedding the RFID electronics assembly in an elastomeric member comprising:

equalizing a first pressure exterior to the elastomeric member and a second pressure interior to the elastomeric member.

* * * * *